(12) United States Patent
Westermair

(10) Patent No.: US 8,156,438 B2
(45) Date of Patent: Apr. 10, 2012

(54) SYSTEM FOR OBJECT-ORIENTED DATA MANAGEMENT OF SECURITIES TRENDS

(75) Inventor: Maria Westermair, Dachau (DE)

(73) Assignee: JC-Janus GmbH, Dachau (DE)

( * ) Notice: Subject to any disclaimer, the term of this patent is extended or adjusted under 35 U.S.C. 154(b) by 859 days.

(21) Appl. No.: 12/078,740

(22) Filed: Apr. 4, 2008

(65) Prior Publication Data
US 2009/0024928 A1 Jan. 22, 2009

(30) Foreign Application Priority Data

Jul. 17, 2007 (DE) .......................... 10 2007 033 279

(51) Int. Cl.
*G06F 3/14* (2006.01)
*G06F 3/17* (2006.01)
(52) U.S. Cl. ................ 715/744; 705/10; 705/14; 705/37
(58) Field of Classification Search .......... 715/200–277, 715/700–867; 700/701–866; 709/201–229; 705/14, 37, 50–79; 345/30–111; 707/1–10, 707/100–104.1, 200–206
See application file for complete search history.

(56) References Cited

U.S. PATENT DOCUMENTS

| | | | |
|---|---|---|---|
| 6,405,195 B1 | 6/2002 | Ahlberg | |
| 2002/0063733 A1 | 5/2002 | Franke et al. | |
| 2002/0099636 A1 | 7/2002 | Narumo | |
| 2002/0161853 A1 | 10/2002 | Burak et al. | |
| 2003/0004853 A1* | 1/2003 | Ram et al. ........................ | 705/37 |
| 2003/0126136 A1* | 7/2003 | Omoigui ........................ | 707/10 |
| 2004/0041846 A1 | 3/2004 | Hurley et al. | |
| 2004/0100467 A1 | 5/2004 | Heaton | |
| 2005/0043992 A1* | 2/2005 | Cohagan et al. ................ | 705/14 |
| 2005/0273408 A1 | 12/2005 | Bandman et al. | |
| 2006/0053056 A1* | 3/2006 | Alspach-Goss et al. ........ | 705/14 |
| 2006/0069635 A1* | 3/2006 | Ram et al. ........................ | 705/37 |
| 2006/0095288 A1 | 5/2006 | Amys et al. | |
| 2006/0287942 A1* | 12/2006 | Anderson et al. ............... | 705/37 |

FOREIGN PATENT DOCUMENTS

| | | |
|---|---|---|
| DE | 198 51 750 A1 | 5/2000 |
| DE | 100 04 542 A1 | 8/2001 |
| WO | WO 01/93124 A2 | 12/2001 |

OTHER PUBLICATIONS

Jern M Ed—Wolter F-E et al. "Thin vs. fat visualization client", Computer Graphics International, Jun. 1998.

* cited by examiner

*Primary Examiner* — Ruay Ho
(74) *Attorney, Agent, or Firm* — Jean C. Edwards, Esq.; Edwards Neils PLLC

(57) ABSTRACT

A system for processing electronic data which is transmitted from a host computer to a client computer is provided. The system converts the electronic data into a target format that differs from the format in which the data was received at the host computer. With the system, stock market-relevant information is to be made accessible, intuitive, and quickly grasped by market laypersons and promotes risk-free and motivating learning of the market's ground rules and an understanding of their complex mechanisms within the stock exchange. The system includes modules to receive and store data on a host computer, to convert the data received at the host computer by a conversion rule into an object-oriented data format, to transmit the converted data to a client computer, its display unit reproducing the transmitted data as graphical objects; and to interactively process the transmitted data on the client computer.

25 Claims, 8 Drawing Sheets world – stock with "easy profit".com welcom guest! log in

Börse:   s e h e n   v e r s t e h e n   p r o f i t i e r e n
         (Börsengesicht)  (Auswahltabelle)   (Testkonto)

I a people of: (select your country)  04

| flag | country | Index | Kurs heute |
|---|---|---|---|
| | Australien | DJ (Aus) | + |
| | Belgien | BEL (20) | − |
| | Brasilien | BOSESPA | +++ |
| | China | SSE | ++ |
| | Deutschland | DAX | = |
| | Europa | DJ (STOXX) | 0 |
| | Finnland | HEX | −− |
| | Frankreich | CAC 40 | + |
| | Großbritannien | FTSE (100) | +++ |
| | Hongkong | HANG SENG | −−− |
| | Indien | | +++ |
| | Italien | MIB (30) | 0 |
| | Japan | NIKKEI | == |
| | Kanada | DJ-Canada | − |
| | Korea | KOSPI (200) | +++ |

Tägliches Gewinnspiel
Jeder kann mitmachen

| flag | country | Index | Kurs heute |
|---|---|---|---|
| | Mexiko | IBC | + |
| | Niederlande | AEX | − |
| | Österreich | ATX | = |
| | Polen | PTX | ++ |
| | Russland | RFX | +++ |
| | Schweden | SEK | 0 |
| | Schweiz | SMI | +++ |
| | Singapur | | +++ |
| | Spanien | IBEX | + |
| | Tschechei | CECE | −− |
| | Türkei | ISE | +++ |
| | Ungarn | HIX | − |
| | USA | DJ (30) | + |
| | USA | S&P | + |
| | USA | NASDAQ | ++ |

FIG. 1a

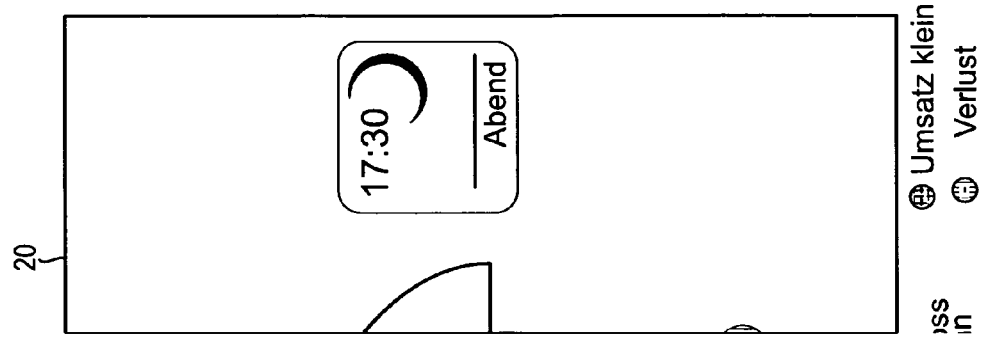
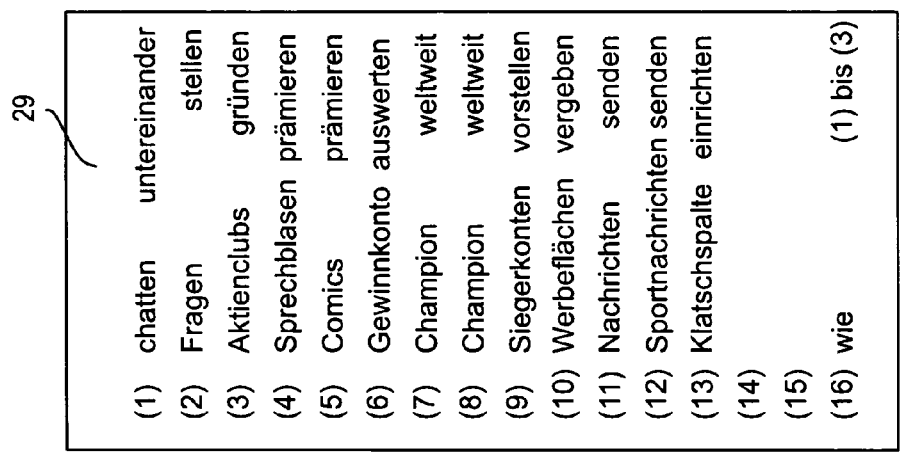
FIG. 3
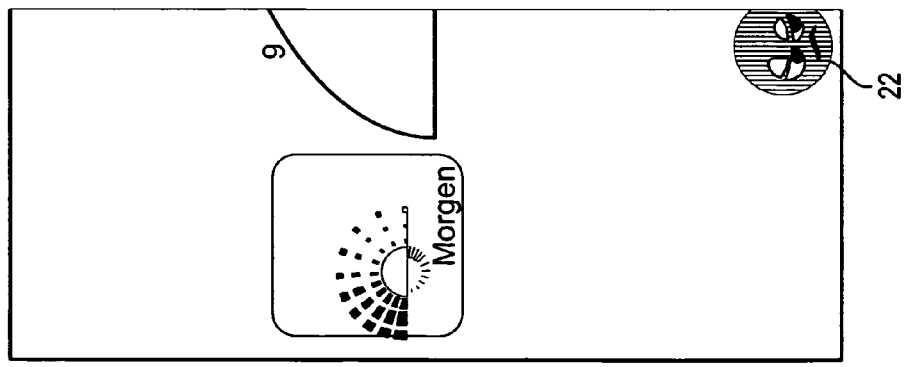

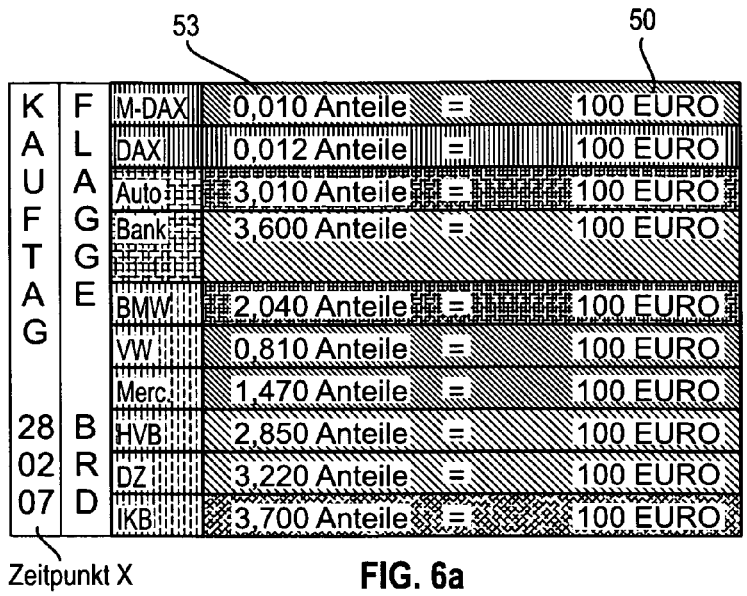
Zeitpunkt X    FIG. 6a
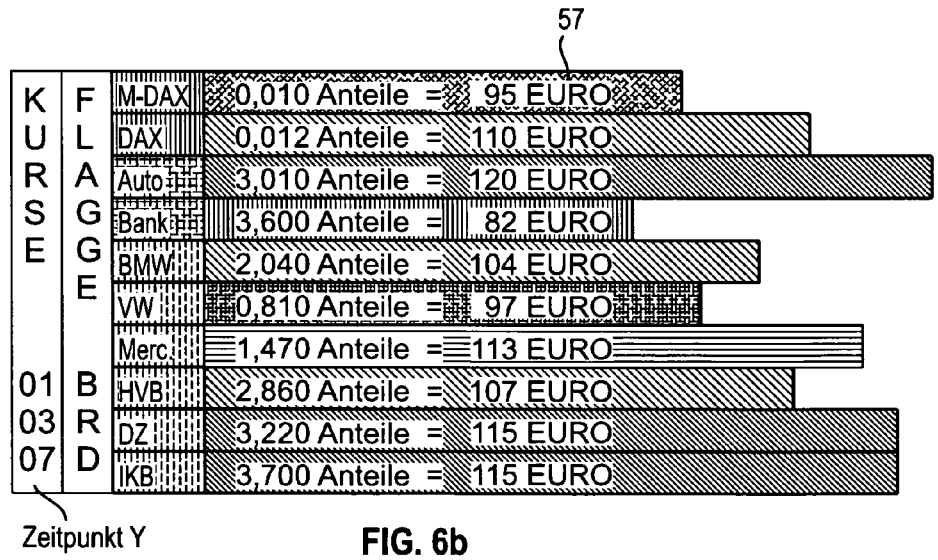
Zeitpunkt Y    FIG. 6b
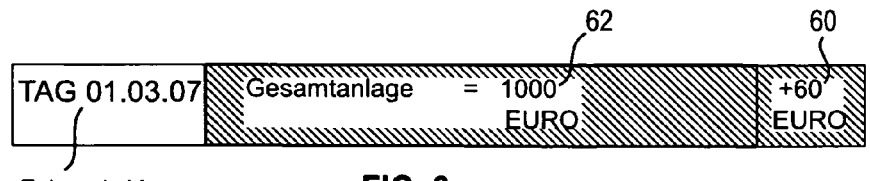
Zeitpunkt Y    FIG. 6c

SYSTEM FOR OBJECT-ORIENTED DATA MANAGEMENT OF SECURITIES TRENDS

CROSS-REFERENCE TO RELATED APPLICATIONS

The present application claims priority from German Patent Application No. DE 10 2007 033 279.5, filed Jul. 17, 2007, the contents of which are herein incorporated by reference in its entirety.

The present invention relates to a system for object-oriented data management of securities trends.

BACKGROUND OF THE INVENTION

Successful trading of listed securities depends on being able to recognize and monitor those parameters which decisively affect the value of a security from among a preponderance of the most disparate information.

Yet particularly those who are new to the stock markets often face a world which is incomprehensible to them, one which seems to consist of innumerable new terms and unfamiliar conventions. Grasping the at-times, complex mechanisms of the market and the actions which can determine a security's performance, requires seemingly detailed specialized knowledge and is often too challenging for those new to the markets. Right from the very start, these neophytes have to make important, i.e., high-risk decisions which have a direct impact on the monetary stakes. The informed and rapid selection and interpretation of information can therefore be of crucial importance to success in this financial world. Yet the existing systems often impede a neophyte's access to this financial segment, unless the novice is wholly prepared to research the specialized terminology and procedural rules in depth beforehand.

The plurality and diversity of communication media available today, now virtually regardless of location or time, affords a good starting point hereto. Traditional information channels such as television, radio and print media, but above all the so-called new media of the internet and its diverse and interactive information offerings via websites, email, chat rooms and online blogs furnish current information virtually around the clock such that this media is ideally suited to being used for market-relevant business applications. The advantage of worldwide access to virtually all information is pitted against the serious disadvantage of those new to the stock market not only having to cull through a preponderance of information, but that comprehending the stock market language and the symbolism with which this information is coded as the cited information channels invariably use cannot be presupposed, especially in the case of one new to the market. An artificial barrier to access is thus initially raised, one which the neophyte can only break through by devoting a great deal of time and concentration to the subject. This is compounded by the fact that the information available on the interaction of rules and effects when trading listed securities is of a structure which is anything but motivating or self-evident to the market layperson. Thus, the stock exchange novice usually sees stock exchange information represented exclusively by numbers and diagrams along with the corresponding technical terms, their complex relationship only discernable at first glance to the market expert. Accordingly, which information could thereby be relevant to the market layperson—often a high-risk decision—the market neophyte has to date had to ferret out alone and yet still bear the consequences which, particularly in the stock market, can have far-reaching impact. Learning the basic principles of trading securities in this way often follows the trial-and-error principle. The diverse information offered is therefore not of real help to the market layperson in this phase of charting such still unknown territory.

SUMMARY OF THE INVENTION

The task which the present invention therefore addressees is that of specifying a system which makes market-relevant information accessible in a way which is intuitive and quickly grasped by the interested market layperson and which promotes a risk-free and motivated learning of the market's ground rules and an understanding of their complex mechanisms within the stock exchange.

The task is solved by a system with which electronic data, which is transmitted from a host computer to a client computer, is converted into a target format which differs from the format in which the data was received at the host computer. In particular, the system includes the following components:

1) a module to receive and store data on a host computer at the request of a client computer in a computer network; a module to convert the data received on the host computer by means of a conversion rule into an object-oriented data format which can be processed by a client computer; a module to transmit the converted data to a client computer upon request of the client computer, its display unit reproducing the transmitted data as graphical objects; and 2) a module for the interactive processing of the transmitted data on the client computer by the user.

In the electronic data that was transmitted to the client computer, the representation methodology for the electronic data is understood to be that which displays this transmitted data on the display unit of the client computer. That means the electronic data, which usually consist of numbers, and which can be attributed a specific information content, is displayed in another more comprehensible way on the client computer; thus, being presented in another format, the target format, which nevertheless still represents the same information content originally attributed to the electronic data.

The technical interface denotes a system-controlled application which filters the inbound electronic data from an external computer network and forwards the same for processing to the appropriate intrasystem module of the inventive system.

Termed the object-oriented data format, is the inventive representation methodology for the electronic data which presents this electronic data in a context-dependent representative form consisting of graphical objects, symbols or icons, which can also be differentiated by their assigned color. The intrasystem approach to generating a correspondent graphical symbol with equivalent information content from the electronic data is termed a conversion rule as implemented in the system according to the invention. The electronic data converted into graphical symbols can be processed interactively by the user; i.e., the user has the opportunity to directly influence the appearance, position and/or type of graphical objects depicted on the display unit of the client computer by means of specific default mouse and/or key combinations and can additionally call up further information attributed to the graphical objects.

An essential point of the invention relates to stock market-relevant data, thus, data which is made available directly from one or more selected world-wide virtual stock exchanges, is displayed exclusively with graphical objects. What this thereby achieves, is that even complex issues and context, as can arise when trading in securities, are brought home to the market layperson in an understandable and motivating manner so as to enable the layperson to intuitively interpret this information so essential to him or her quickly and correctly, solely due to the representative form of the graphical objects. The market layperson, drawing on the interactive use of the system, thus, receives—in consideration of his or her previous knowledge—a cautious introduction to the stock exchange world, gradually gaining the expertise to recognize the complex interactions inherent to securities trading and being able to coherently interpret market-relevant information and use it to make the appropriate decisions.

It is thus, for example, provided for a single graphical object—assuming the task of a multi-functional information carrier—to be assigned a plurality of information items. This has the advantage that a preponderance of information which to date could only be considered as individual items, can be depicted simultaneously for faster comprehension by the market neophyte. If this information has an interdependency as cause-effect variables, this then additionally promotes an intuitive understanding of the complex associations between the graphically-depicted parameters which can have a bearing on a security's market value.

The information content of a graphical object is specified by the representative form assigned to it. There are additionally three degrees of freedom to the visual parameters of form, color and positioning of a graphical object within a defined reference area in order to combine a preponderance of information in a meaningful manner using only one graphical object. This has the advantage that the market layperson can grasp and attribute the continually changing information content at a quick glance and nevertheless, still maintain the overview, since the individually depicted graphical objects are clearly visually differentiated from one another. The automatic customization of the specific representative form of a graphical object moreover allows a more targeted responsiveness to the sentiments of the addressed target group.

The system, furthermore, provides for the specific representative form of the graphical objects as information carriers to adjust dynamically to the security's performance during the active trading hours of the stock exchange. The user can thus, monitor the market performance of the selected security in real time. The individual market trend stages at defined times, thus, the respective specific representative forms of the selected information carrier at a defined point in time, are thereby frozen and depicted such that the up-to-the-minute market trend for the security can be gleaned at a glance.

It is provided in one embodiment, for the system to depict the sales and performance of a security being monitored in real time with only one graphical object. The market layperson, thus, receives an immediate status report on his or her selected security's trend for any point in time.

In another embodiment, the graphical objects encompass the information carrier being able to assume the function of interactive buttons. The graphical objects can thereby trigger information-processing events such as, e.g., the display of context-related information in the form of news, comments, text balloons, etc., the same being automatically controlled by the system. It is however, also provided for the market layperson to be able to trigger such events directly with his or her mouse in order to thereby expand his/her own interaction radius.

For a clear, well-designed arrangement of the graphical objects, it is advantageously provided for their dynamic positioning within a defined area of a so-called market performance field. This thereby, always provides the market layperson with a precise overview of the current status of the market/sales trend for his or her selected security.

The market performance field is additionally advantageously subdivided such that the current market trend for the selected security can be deduced from the relative position of the graphical objects at a defined point in time so that just one field is sufficient in order to depict market-relevant information, thereby considerably enhancing clarity.

The market performance field advantageously allows for integrating interactive online services within a defined area in which the up-to-the-minute security performance is positioned dynamically in the market performance field. This online service enables the market layperson to call up additional information and/or exchange information with other networked subscribers, for example, with chat/blog functions. Yet he or she can simultaneously keep an eye on the current status of the monitored security's development so as to be able to react at any time to changes without needing to switch back and forth between different views.

In another embodiment, the market performance field provides for using its free spaces for the placing of interactive informational advertising content such as, e.g., online advertisements. By furnishing additional information on varied topics, products and services, companies would thereby be able to run target group-oriented advertising. The advertisements, run online in combination with images, text or interactive elements which respond to user interaction, can thereby be motion-controlled across the area of the market performance field.

The duration of the ad shown—i.e., its presence online or the time during which the informational advertising content is visible for the logged-in user—can thereby be configured by the system accordingly. The duration of an online presence for the depicted informational advertising content can also be made contingent on a leasing fee the advertising client pays in advance to the respective provider. The advertising client thereby purchases online time in order to be allowed to advertise his products in the market performance field. This form of advertisement is not limited exclusively to the market performance field of the application, however, and can also be implemented in other display panels and menus of the application according to the invention based on client requests and specifications.

The time and manner of representation regarding the online informational advertising content can moreover be advantageously adapted to the operating or open hours of the available worldwide stock market exchanges selected by the user. However, it would be just as conceivable to use the free spaces of the market performance field for running informational advertising content after a stock exchange closes, when the stock performance display for the user's selected virtual stock exchanges is halted in the market performance field. The logged-in user then has the opportunity to either consider the informational advertising content shown or have another look at the stock performance for a selected interval of time, for example the past day from his preferred virtual stock exchange. Advertisers are thus, given an online platform which allows them to accordingly run target group-specific advertising content at selected periods of time. The form and format of the presented informational advertising content is naturally just as configurable by the system during the booked online time.

In another embodiment, furnishing the informational advertising content additionally provides for the content of the presented informational advertising content to be adapted to the interests of the logged-in user, his/her user profile respectively, provided that the user has made this information publicly available and agrees to being shown personalized informational advertising content. This form of personalized advertising yields a win-win situation for both sides: namely, the advertiser only offers a potential customer that informational advertising content on its products online which could be of interest to said customer; and the customer, on the other hand, is spared advertising content which would not be of interest to him or her or not match his/her user profile.

The system moreover provides for the transmitted stock exchange data to be automatically transformed into an interactive security map, the market selection account, according to defined categories and rules. Selected market quotations along with their trend histories are listed therein for the preselected country according to industry and company affiliation. Based on this listing, the market layperson can easily put together his or her individual securities portfolio with which he or she can then trade. Each category in the market selection account is additionally allocated it own assigned color code which is uniformly used in order to simplify the user's assigning of a listed security to a corresponding category.

In another embodiment, the user-defined selection of securities in the market selection account, which the market layperson is interested in trading, are summarized in an interactive securities account—the test account. In so doing, the dynamically-variable market prices for the selected securities are likewise depicted in the manner described above by characteristic, likewise dynamically-variable representative forms of graphical objects so that the market layperson receives an immediate overview of the current market status of the selected securities in his or her test account, with which he or she can trade during trading hours. The test account always displays the current balance resulting from the activities of the market layperson to same in a practical manner so that such neophytes are kept informed of the effects of their transactions at all times.

The overall result of the transactions effected by the market layperson with his/her selected securities is then displayed in a further summarizing interactive securities account, the so-called profit account. This view also works exclusively with graphical objects as information carriers so that the market layperson can immediately grasp the effects of his/her transactions.

A further embodiment of the described system provides for the functional configuration of the different views within the application such as market performance field, test account and profit account, to adjust automatically to the foreknowledge of the market layperson. By so doing, market laypersons who have no previous knowledge or experience whatsoever in dealing with stock exchange information are not confronted with information and functionalities which are initially incomprehensible to them. Hence, at a first level, only those basic functions which are necessary for a minimum understanding of dealing with securities are made available to the user. Once, however, the market layperson becomes more familiar with the fundamental terms and rules of stock exchange transactions, he or she can then interactively select a second level of further functionalities and additional market-relevant information.

BRIEF DESCRIPTION OF THE DRAWINGS

Embodiments and drawings will be used in the following to specify the invention in greater detail.

FIG. 1*a* is a two-dimensional representation of the home page of the website for selecting the respective country;

FIG. 3 is a two-dimensional representation of the market performance field with a dynamically-positionable placeholder for the integration of interactive online services;

FIG. 6*a* is a two-dimensional representation of an interactive profit account including detailed rate data on buy-date X;

FIG. 6*b* is a two-dimensional representation of an interactive profit account including detailed rate data on buy-date Y;

FIG. 6*c* is a two-dimensional representation of the daily result realized on buy-date Y.

DESCRIPTION OF THE INVENTION

Figure 1:
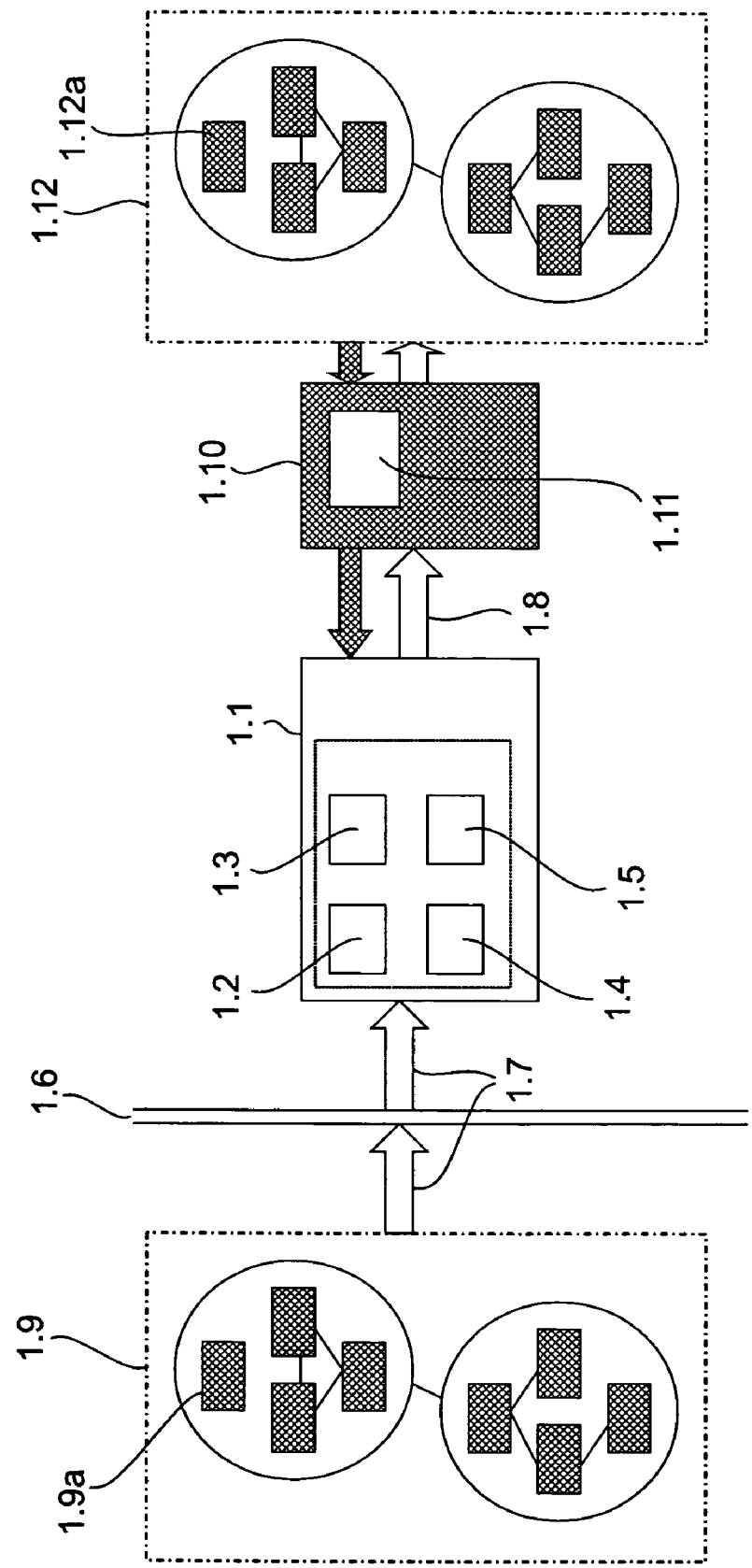
FIG. 1 is a representation of one embodiment of the inventive structure of the system and its connection to external data processing systems.

FIG. 1 shows the system 1.1 according to one embodiment of the invention with the modules 1.2, 1.3, 1.4 and 1.5 and its connections to external and internal interfaces. Electronic data 1.7 is hereby supplied from an external computer network 1.9, which consists of computers 1.9*a*, and delivered to system 1.1 via a technical interface 1.6. The system 1.1 processes the delivered data 1.7 pursuant an intrasystem conversion rule and transmits the transformed electronic data 1.8, which the system 1.1 converted into a new target format, to the user's client computer 1.10, the display unit 1.11 of which displays the transformed electronic data in the form of graphical objects. The client computer 1.10 itself can in turn be a component of a further computer network 1.12 which can be comprised of further interconnected client computers 1.12*a*.

FIG. 1*a* shows the home page of the application's website. On this home page, the user first selects that country 02, along with its listed securities and indices, in which he or she wants to trade. The user is moreover shown the respectively current market trend of the country-specific stock exchange indices in the "Today's Market" column 04.

Figure 1B:
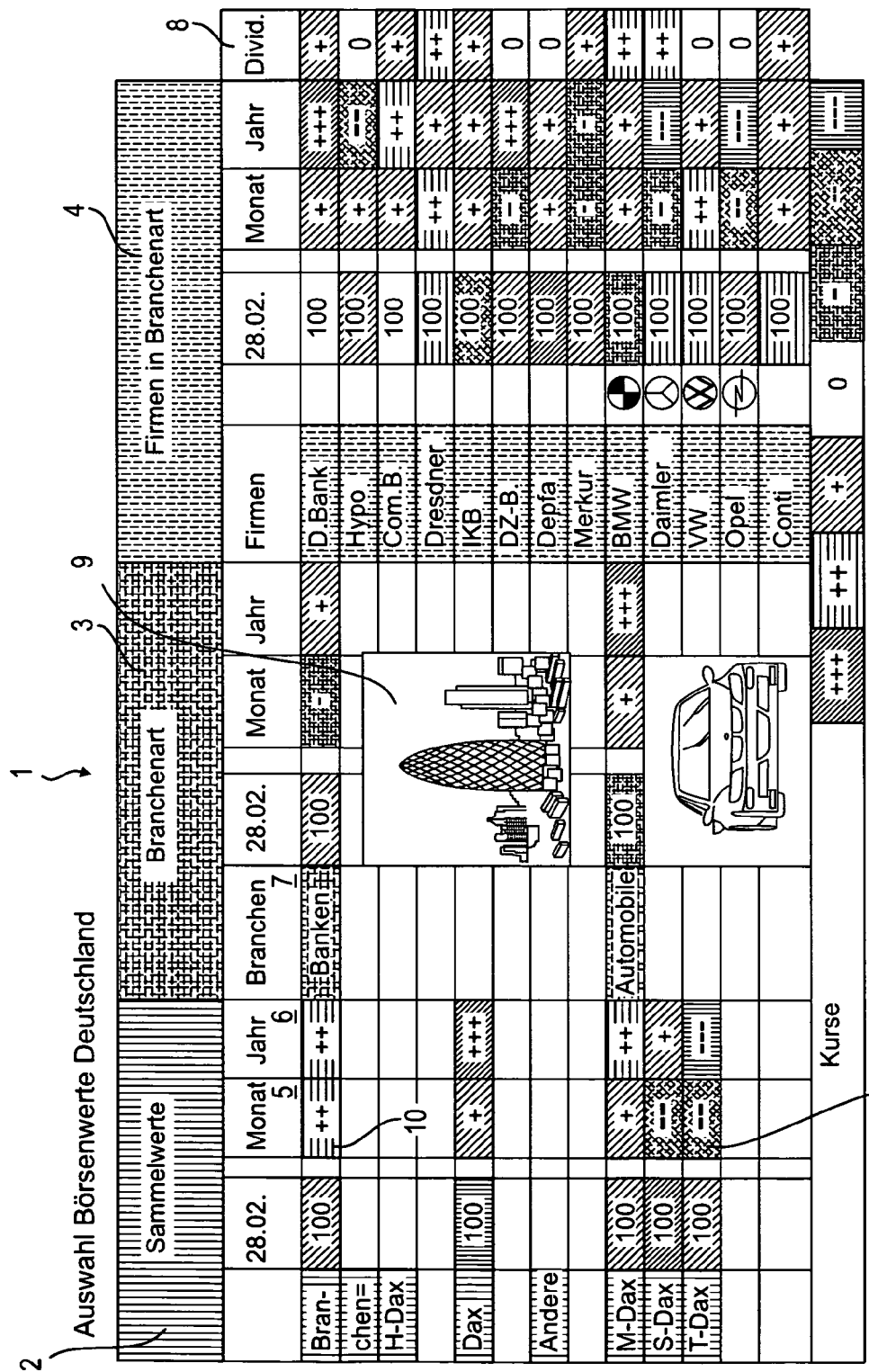
FIG. 1*b* is a two-dimensional representation of the market selection account with a detailed depiction of the catalogued distribution of the selectable market quotations.

In the market selection account 1 of FIG. 1*b*, the user can select his or her favourite securities for speculation from a global pool of available stock exchanges listing the most important securities and stock exchange indices for the respective country. Available for user selection are thereby the categories of Collective Securities 2, which indicates the exchange indices of the participating countries, Industry Class 3 such as, e.g., banks and the automotive industry, and the Company Value 4 associated with the industry classes. The fields of each category are thereby respectively coded by means of a significant category-allocated color so that the user quickly grasps the meaning of the respective fields. The significant color coding also remains as such in the various different views. There is furthermore the possibility in the market selection account 1 to trace the daily and historical trends for the respectively displayed securities. This is represented by a corresponding graphical character 10, e.g. a "+" or "−" sign for rising/falling market trends, or a numerical value in the columns entitled Current Date 5, Month 6 for the historical monthly market trend, Year 7 for the historical yearly market trend and Dividend 8 indicating a dividend payout. The graphical symbols to be entered in the respective columns thereby correspond to specific quoted numerical values for the daily, monthly and yearly market trends as furnished by an interface and transformed for display in the market selection account. As is additionally evident from FIG. 1, each industry represented has its own industry-related icon 9. The selection of the user's securities is thereafter transferred to the user's personal test and profit account. The market selection account furthermore, enables the companies which are listed in the Industry Class 3 category to advertise nationally or internationally on their respective sales/performance element page. The sales/performance element page is thereby a special page from which the user can receive a listing of the data associated with a company in terms of its sales and market value rates.

Figure 2:
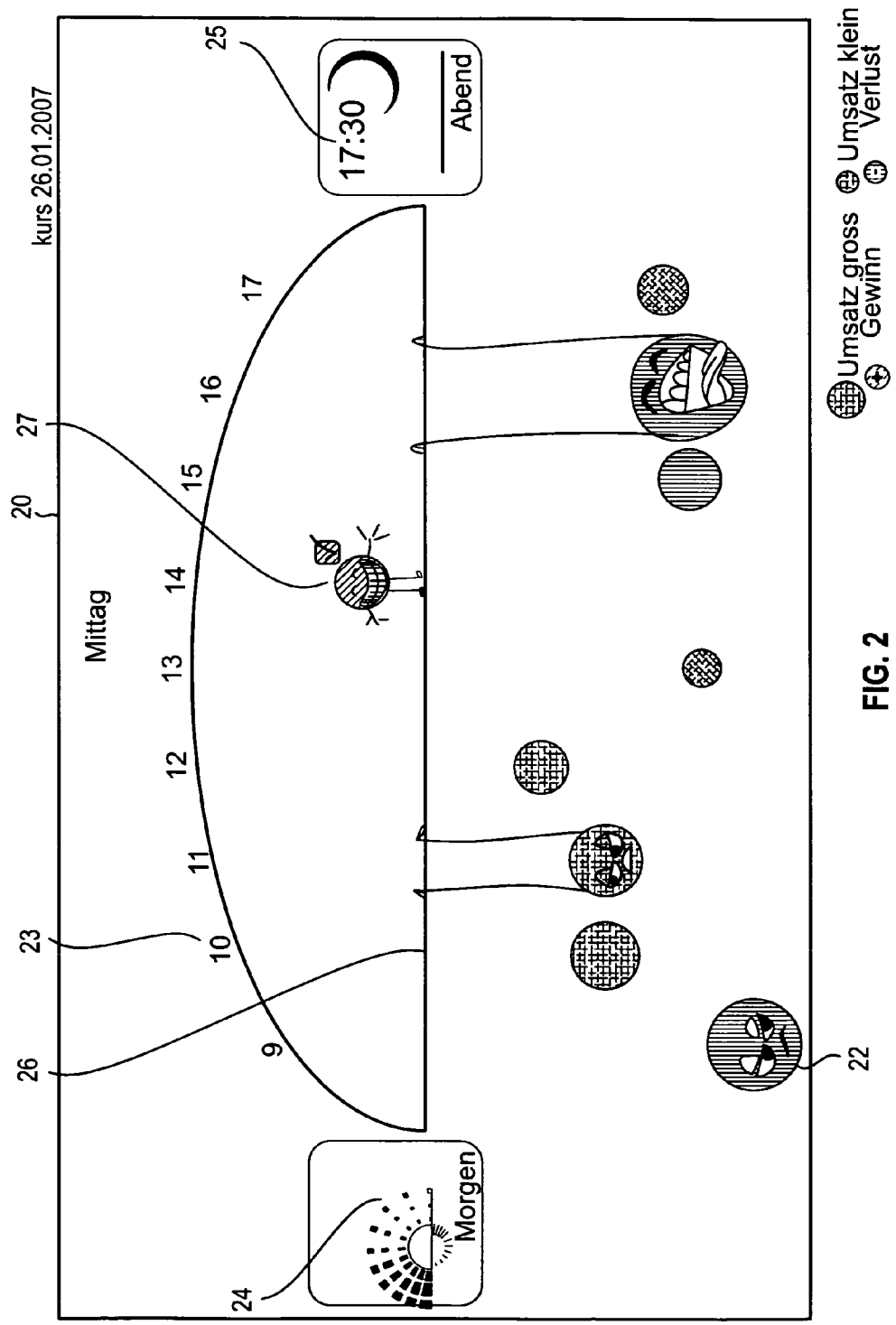
FIG. 2 is a two-dimensional representation of the market performance field containing graphical objects in accordance with the invention.

The market performance field 20 of FIG. 2 chronicles and displays the up-to-the-minute market trend of a selected security. The respectively selected security is displayed in the form of a graphical object 22 which migrates across the field during the market's trading hours. The field contains a virtual coordinate system which plots invisible horizontal and vertical reference lines by means of which corresponding information content can be allocated and read out based on the position of a graphical object. In the horizontally-extending trend of the virtual coordinate system, the field is divided into time zones, e.g., hour segments 23, in order to simulate the length of a full trading day so that the selected security's performance can be tracked at any given point in time. The corresponding sunrise 24 and sunset 25 icons indicate the market's opening and closing to the user. The position of a graphical object in the vertically-extending trend attributes a specific respective positive or negative result to the graphical object.

The representative form of the graphical object 22 enables performance and revenue information to be displayed using just one single graphical object. This is achieved by the appropriate coding to the color and design of a graphical object, its representative form changing in real time depending upon the current stock performance. Each specific representative form of a graphical object is assigned the corresponding market figures which the stock exchange delivers to an interface. These market figures as furnished are transformed in the market performance field pursuant the described method so that the position and representative form of a graphical object is controlled solely by the listed security with which the graphical object is coupled. Graphical objects can correspondingly likewise be used to symbolically depict occurring events such as, e.g., stock price plunges, etc.

A graphical object, in addition to its flexibly linkable information content, is also an interactive element which can display system-triggered or user-triggered information. One representative form, for example, thus, provides for a user being able to call up additional information, e.g. by way of text balloons, etc., by clicking on a graphical object.

The market performance field furthermore, consists of fixed and variable elements. A fixed element can for example be a horizontally-extending center line 26 which divides the field into an upper and a lower half. By so doing, the two sections of the divided field can each be allocated additional visual information content which can be manifested for example by means of a dynamically changed background color.

Another representative form, for example, is provided by a graphical object 27 positioned above the center line being assigned a positive performance/revenue value by the appropriate color value and representative form; when in contrast the graphical object 22 is in the field section below the center line, the graphical object displays a different corresponding representative form in order to symbolize its negative performance/revenue value. The variable elements in the market performance field 20 are comprised of graphical objects, colors, diagrams, icons and other similar visual tools.

In the market performance field 22 of FIG. 3, which shows the integration of online services, an unused area can be used to make interactive online services and/or current information available to the user, for example individual transaction status on traded securities. In one representative form, for example, interactive applications 29 with chat and/or blog functionalities are conceivable in order to make communication possible between networked users. The unused area can likewise be used as an advertising vehicle for companies. The size and position of this unused area intended for such interactive services is thereby dynamically configurable and shifts to the right on a virtual horizontal line as the trading day progresses so that each graphical object 22 displayed always remains visible to the user.

Figures 4, 5:
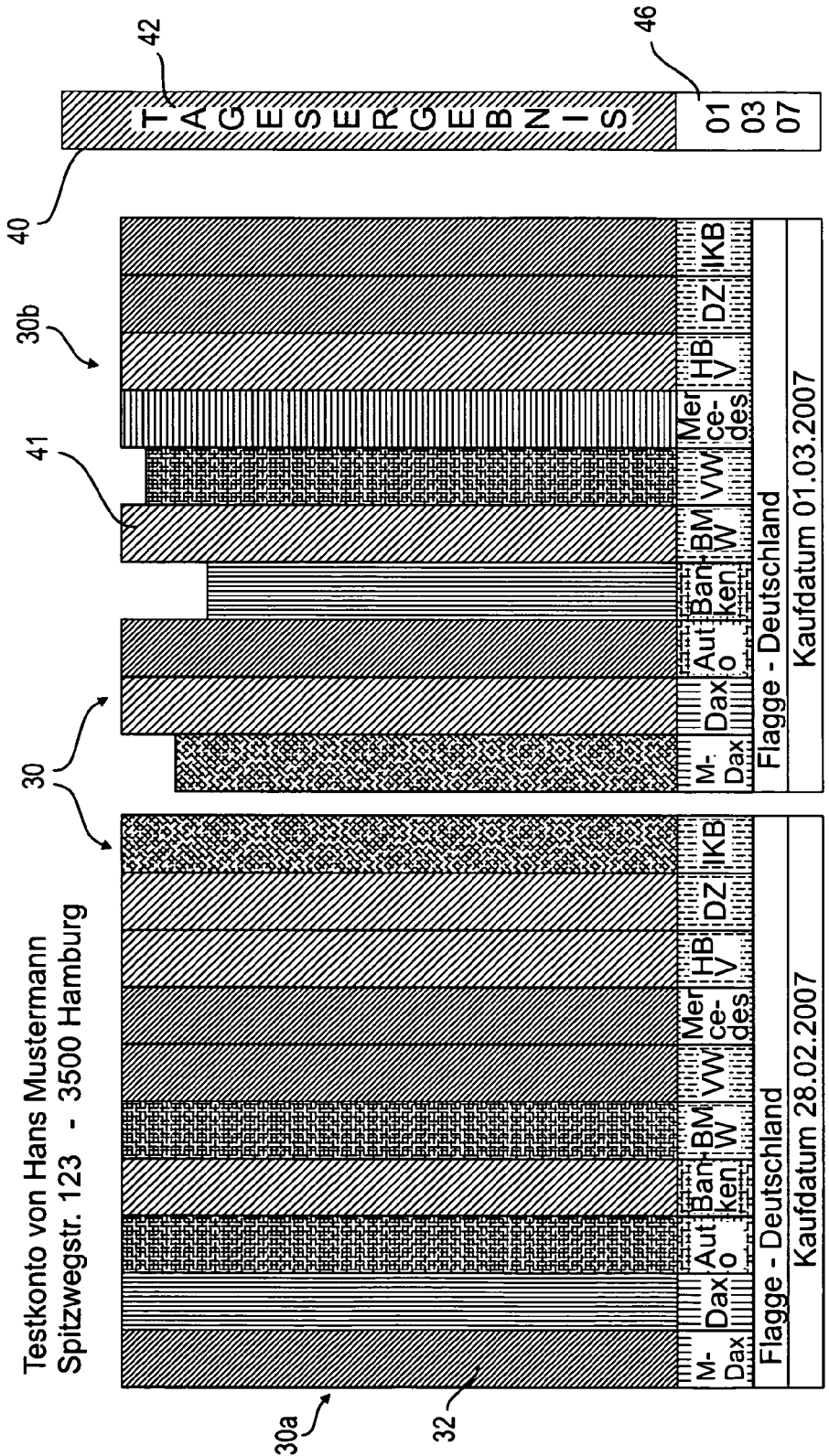
FIG. 4 is a two-dimensional representation of an interactive securities account (test account) with a detailed depiction of the daily result realized.
FIG. 5 is a two-dimensional representation of an interactive profit account.

Test account 30, one representative form of which is depicted in FIG. 4 as an example, displays a specific number of current daily values 32 for the Collective Securities, Industry Class and individual Company Values which the user can, e.g., drag-and-drop from his/her market selection account 1 into his/her test account 30. In so doing, the user buys a specific number of securities at a fixed price on the buy-date, the performance of which can then be monitored in the market performance field 20. The test account depicts the market trend for the selected securities on the buy-date by means of a first daily test account 30a and on the day after the buy-date by means of a second daily test account 30b.

Upon the lapsing of a specific period of time, e.g., one week, the user can moreover exchange the selected securities for others. The test account 30 itself is linked to a technical interface which transmits the continuously varying values on the securities being monitored to the test account 30 so that the user can track the market trend of the listed securities 32 in real time during trading hours.

In the present embodiment of the test account of FIG. 4, the positive and negative results ensuing from the user's trading activities with the individual securities 41 are additionally displayed in bar-graph form. The length of a bar stands in direct relation to the current price of a security. If the reference mark, i.e., the value of a security on day X, is for example at a value of 100 Euro and the bar extends above that, this is then a sign of the security's increase in value. Analogously, when the bar falls below the reference mark, this is then a sign that the security has lost value compared to an earlier point in time, for example the day before. The color of a bar changes as a function of whether the security assigned to it has gained or lost value.

After a specific stock exchange closes, apparent from the respective date 46 in FIG. 5, the user will be displayed a corresponding positive or negative balance 42 in his/her profit account 40 in FIG. 5. The balance 42 results from the addition and subtraction of the individual values from the represented daily test accounts 30a and 30b from FIG. 4. The profit account 40 uses graphical objects to show the daily positive/negative results 42 realized by the user on the day after purchasing the corresponding securities. The profit account in FIG. 5 is automatically updated in real time. Each internet subscriber can set up one or a plurality of profit accounts. Each profit account is supplied a virtual sum of money in the respective country's currency on buy-date X, which the user can use for speculating with his or her selected securities. In a further use of the profit account, the user can for example send in his/her realized daily results within the confines of a contest. The profit account with the highest daily balance surplus is paid the amount exceeding the buy-date sum. By the same token, the poorest profit account result is also awarded.

In the further FIG. 6 representation of a profit account, the FIG. 5 representation has been rotated 90°. In this representation as well, the length of the bars constitutes a proportional measure of a security's current value. The corresponding values 50 of the respective securities are additionally indicated in numerical values here. In FIG. 6a, the respective shares 53 of the individual securities are listed and a reference value 50 is assigned to represent the value of a security at the indicated time point X. FIG. 6b indicates the state of the profit account relative another, usually later, time point Y from that in FIG. 6a. The changed market values 57 for the individual securities are indicated here by the change in bar length and the corresponding numerical values 57. FIG. 6c then calculates and displays the positive or negative result 60 for the security transactions at time point Y from FIG. 6b which results from the difference between the results for the individual securities 57 from FIG. 6b and the given amount 62 of the total investment from FIG. 6c.

Figure 7:
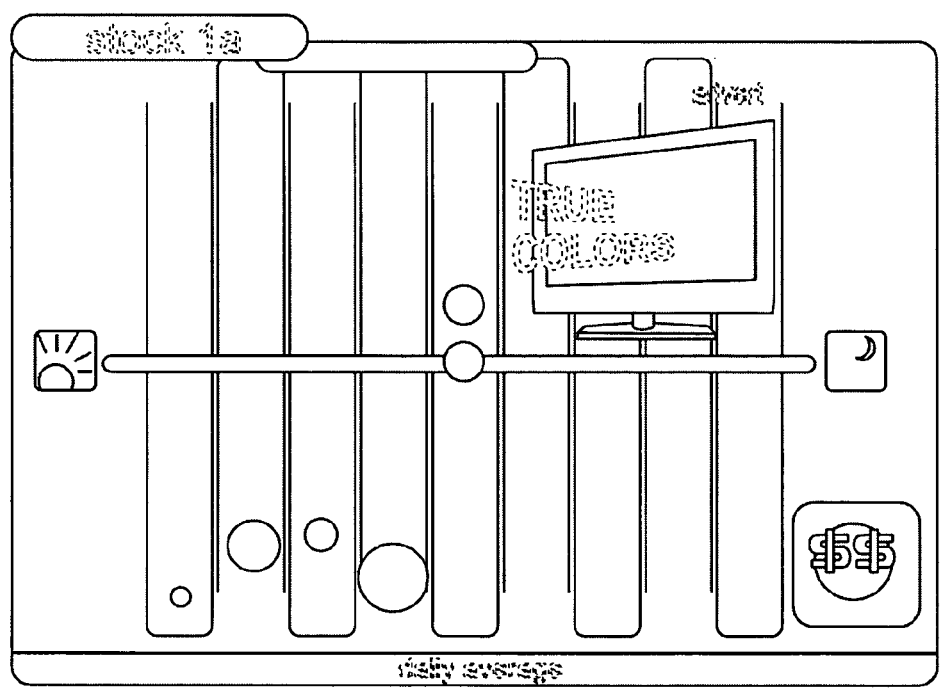
FIG. 7 is a representation of the market performance field with integrated informational advertising content

Informational advertising content is integrated into the market performance field of FIG. 7. This informational advertising content, which can span the entire background area of the market performance field, can be time-controlled; i.e., the online advertisements of an advertising client can be contingent, among other factors, upon the online time which the advertising client has booked by paying the corresponding fee.

One variant of the embodiment additionally provides for the type of representation to the displayed informational advertising content to change in line with the daily, monthly or yearly trend to the market quotation. FIG. 7 shows an embodiment, for example, in which the background image for the informational advertising content to be displayed is continuously replaced by an area of lesser transparency over the progressive course of the day for a selected virtual stock exchange market. For example, when the selected market time is 12:00 p.m., 50% of the background image is already concealed. After the market closes, however, it would be 100%; i.e., the informational advertising content would be completely masked at this point in time and no longer visible to the logged-in user. In this way, although not limited to this embodiment, presented informational advertising content can be successively shown and hidden at a specific rate, thus, indicating the correlation between booked online time and displayed advertising content.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

The invention claimed is:

1. A system for processing electronic data which is transmitted from a host computer to a client computer so as to convert the electronic data into a target format which differs from a format in which the electronic data was received at the host computer, comprising:
    a first module to receive and store the electronic data from a first computer network on the host computer via a technical interface at a request of the client computer in a second computer network;
    a second module to convert the electronic data received at the host computer using a conversion rule, into an object-oriented data format which can be processed by the client computer;
    a third module to transmit the converted electronic data to the client computer at the request of said client computer, a display unit of the client computer which displays the transmitted data as displayed graphical objects;
    a fourth module for interactive processing of the transmitted data on the client computer,
    wherein a specific representative form of at least one of the displayed graphical objects is dynamically-continuously adapted in order for the at least one displayed graphical object to display an assigned information content of a security's market performance as a function of time,
    wherein the at least one displayed graphical object comprises a graphical icon which migrates across a defined field of the display unit during trading hours of a market, and
    wherein at least some of the displayed graphical objects have a function of interactive buttons, wherein the interactive buttons are operative to activate information-processing events from user or system-triggered actions.

2. The system according to claim 1, wherein the at least one displayed graphical object for said first computer network can be concurrently assigned with a plurality of information items.

3. The system according to claim 2, wherein an information content of the transmitted data of the at least one displayed graphical object for said first computer network is defined by a representative form of the at least one displayed graphical object.

4. The system according to claim 3, wherein the representative form of the at least one displayed graphical object for said first computer network in a defined field differs in form, color and positioning from other displayed graphical objects.

5. The system according to claim 4, wherein a sales and performance of a security is displayed using a single graphical object.

6. The system according to claim 4, wherein the system displays results realized by market activities of the user in a further interactive securities account with the displayed graphical objects.

7. The system according to claim 3, wherein a sales and performance of a security is displayed using a single graphical object.

8. The system according to claim 3, wherein the displayed graphical objects are dynamically positioned within a defined area of a market performance field, said displayed graphical objects consisting of fixed and dynamic objects.

9. The system according to claim 3, wherein the system displays results realized by market activities of the user in a further interactive securities account with the displayed graphical objects.

10. The system according to claim 1, wherein the electronic data transmitted for said first computer network constitutes stock market data.

11. The system according to claim 1, wherein a performance of selected securities is displayed in a defined field in real time and exclusively using a finite number of different representative graphical objects.

12. The system according to claim 1, wherein the system dynamically positions the displayed graphical objects within a defined area of a market performance field, said displayed graphical objects comprising fixed and dynamic objects.

13. The system according to claim 12, wherein a market performance field area is subdivided for a security such that a position of at least one of the displayed graphical objects within the market performance field is a further characteristic property of a status of the corresponding security at a defined point in time.

14. The system according to claim 13, further comprising interactive online services integrated within an area of the market performance field.

15. The system according to claim 13, further comprising space furnished for placing interactive informational advertising content within an area of the market performance field.

16. The system according to claim 15, wherein the interactive informational advertising content is motion-controlled across the area of the market performance field.

17. The system according to claim 15, wherein a display of interactive informational advertising content is controlled according to time.

18. The system according to claim 17, wherein a duration of an online presence of the interactive informational advertising content is regulated contingent upon an advance fee paid by an advertising client.

19. The system according to claim 17, wherein a duration of an online presence and a type of representation of the interactive informational advertising content is regulated contingent upon operating hours of a selected stock exchange market.

20. The system according to claim 12, wherein a functional configuration of the fixed and dynamic objects and their correlation within an application are adapted to a foreknowledge of the user.

21. The system according to claim 1, wherein interests and needs of the user are responded to by displaying personalized informational advertising content.

22. The system according to claim 1, wherein transmitted stock exchange data are automatically transformed into an interactive security map according to defined categories and rules from which the user selects securities to monitor as to market trend.

23. The system according to claim 1, further comprising a user-defined selection of securities which is summarized in an interactive securities account, wherein dynamically-variable market values for the selected securities are represented by characteristic representative forms of the displayed graphical objects.

24. The system according to claim 23, wherein the securities account is configured so as to always display a current balance to the user.

25. The system according to claim 1, wherein the system displays results realized by market activities of the user in a further interactive securities account with the displayed graphical objects.

* * * * *